United States Patent
Some et al.

(10) Patent No.: US 11,619,797 B2
(45) Date of Patent: Apr. 4, 2023

(54) DIELECTRIC PREDICTABLE BREAK LOAD AERIAL DROP CABLE

(71) Applicant: Sterlite Technologies Limited, Gurgaon (IN)

(72) Inventors: Sashanka Some, Gurgaon (IN); Dnyaneshwar Wagh, Gurgaon (IN)

(73) Assignee: Sterlite Technologies Limited, Haryana (IN)

( * ) Notice: Subject to any disclaimer, the term of this patent is extended or adjusted under 35 U.S.C. 154(b) by 0 days.

(21) Appl. No.: 17/485,468

(22) Filed: Sep. 26, 2021

(65) Prior Publication Data

US 2022/0317407 A1 Oct. 6, 2022

(51) Int. Cl.
*G02B 6/44* (2006.01)

(52) U.S. Cl.
CPC ......... *G02B 6/4495* (2013.01); *G02B 6/4432* (2013.01)

(58) Field of Classification Search
CPC .................................................... G02B 6/443
See application file for complete search history.

(56) References Cited

U.S. PATENT DOCUMENTS

| 4,166,670 A * | 9/1979 | Ramsay | G02B 6/441 385/113 |
| 5,384,880 A * | 1/1995 | Keller | G02B 6/4494 385/100 |
| 8,538,216 B2 * | 9/2013 | Abernathy | G02B 6/4402 385/100 |
| 2003/0082380 A1 * | 5/2003 | Hager | G02B 6/4432 428/297.4 |

FOREIGN PATENT DOCUMENTS

| EP | 0227326 A2 * | 7/1987 | ............. G02B 6/443 |
| EP | 3270201 A1 * | 1/2018 | ............. C08F 10/00 |

OTHER PUBLICATIONS

R&M Fiber Optic Cables Product Catalog 2020 https://downloads.rdm.com/CHE/FO-Cables_Catalog.pdf (Year: 2020).*

* cited by examiner

*Primary Examiner* — Charlie Y Peng
(74) *Attorney, Agent, or Firm* — Steven R. Fairchild; Arun Narasani

(57) ABSTRACT

The present invention discloses a dielectric predictable break load aerial drop cable comprising one or more optical transmission elements, a first layer surrounding the one or more optical transmission elements, a plurality of strength yarns surrounding the first layer, an outer sheath surrounding the plurality of strength yarns. In particular, the outer sheath has a plurality of strength members embedded in an equilateral position. Moreover, the dielectric predictable break load aerial drop cable breaks at a predefined break load with a neutral bending performance.

18 Claims, 2 Drawing Sheets

DIELECTRIC PREDICTABLE BREAK LOAD AERIAL DROP CABLE

CROSS-REFERENCE TO RELATED APPLICATIONS

This application claims the benefit of Indian Application No. 202111015012 titled "Dielectric Predictable Break Load Aerial Drop Cable" filed by the applicant on 31 Mar. 2021, which is incorporated herein by reference in its entirety.

FIELD OF THE INVENTION

Embodiments of the present invention relate to a field optical fiber cable. And more particularly, relates to a dielectric predictable break load aerial drop cable.

DESCRIPTION OF THE RELATED ART

Optical fiber cables have secured an important position in building optical networks of modern communication systems across the globe. The optical fiber cables are part of millions of miles of the optical network. From mountain regions to shore lines, from remotest villages to urban environments, engineers have installed the optical fiber cables almost in every region for better internet connectivity and high bandwidth. The optical fiber cables are of various types that may be utilized for various applications and one of the various types of the optical fiber cables include aerials cables or overhead cables.

Typically, the overhead or aerial cables provide an unobtrusive, convenient and cost-effective way for data transmission but also come with drawbacks, such as susceptibility to external hazards like high winds, extreme temperatures, falling tree branches and vehicle accidents.

Consequently, robust tensile strength i.e., resistance to breakage and a host of other mechanical features are vital, but with this comes another risk. In the event of high-sided vehicle strikes on poles or other support structures, the aerial cables' superior tensile strength (superior tensile strength means the cables don't break at the critical point) causes the poles or other structures to collapse that potentially leads to lengthy and costly repairs to large parts of infrastructure. In extreme cases, injury to personnel and damage to nearby properties may also be possible.

Thus, to solve the aforesaid problem and reduce operators repair time and cost, there exists a need to develop a suitable cable.

Hence, the present invention focuses on dielectric predictable break load aerial drop cable.

SUMMARY OF THE INVENTION

An embodiment of the present invention relates to a dielectric predictable break load aerial drop cable. In particular, the dielectric predictable break load aerial drop cable comprises one or more optical transmission elements, a first layer surrounding one or more optical transmission elements, a plurality of strength yarns surrounding the first layer and an outer sheath surrounding the plurality of strength yarns.

In accordance with one embodiment of the present invention, the outer sheath has a plurality of strength members embedded in an equilateral position. In particular, the equilateral position has the plurality of strength members arranged in radially equidistant manner and circumferentially equidistant manner whereby enables breaking of the dielectric predictable break load aerial drop cable at a predefined break load and having a neutral bending performance.

In accordance with one embodiment of the present invention, the predefined break load is between 1300 to 2100 N.

In accordance with one embodiment of the present invention, each of the plurality of strength members has the plurality of strength yarns held together by epoxy.

In accordance with one embodiment of the present invention, the plurality of strength members is crushed to crimp the plurality of strength members with a connector.

In accordance with one embodiment of the present invention, the dielectric predictable break load aerial drop cable has a crush resistance of 1000 N/100 mm (+/−10%).

In accordance with one embodiment of the present invention, the dielectric predictable break load aerial drop cable has a sag less than 2% at a span length of 50-70 meters. Particularly, the sag is 1.8 m, when the dielectric predictable break load aerial drop cable is loaded with 35-50 kg load along a length at a span of 50-70 m, In accordance with one embodiment of the present invention, the dielectric predictable break load aerial drop cable has a strain less than 0.8 in one or more optical transmission elements, the dielectric predictable break load aerial drop cable is loaded with 35-50 kg load along the length at the span of 50-70 m.

In accordance with one aspect of the present invention, the dielectric predictable break load aerial drop cable breaks at a predefined break load and has a neutral bending performance.

The foregoing objectives of the present invention are attained by employing a dielectric predictable break load aerial drop cable.

BRIEF DESCRIPTION OF THE DRAWINGS

So that the manner in which the above recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. The invention herein will be better understood from the following description with reference to the drawings, in which.

ELEMENT LIST

Break load aerial drop cable 100
Optical Transmission Elements 102
First Layer 104
Strength Yarns 106
Outer Sheath 108
Strength Members 110

It should be noted that the accompanying figure is intended to present illustrations of exemplary embodiments of the present disclosure. This figure is not intended to limit the scope of the present disclosure. It should also be noted that the accompanying figure is not necessarily drawn to scale.

DETAILED DESCRIPTION OF THE INVENTION

Figure 1:
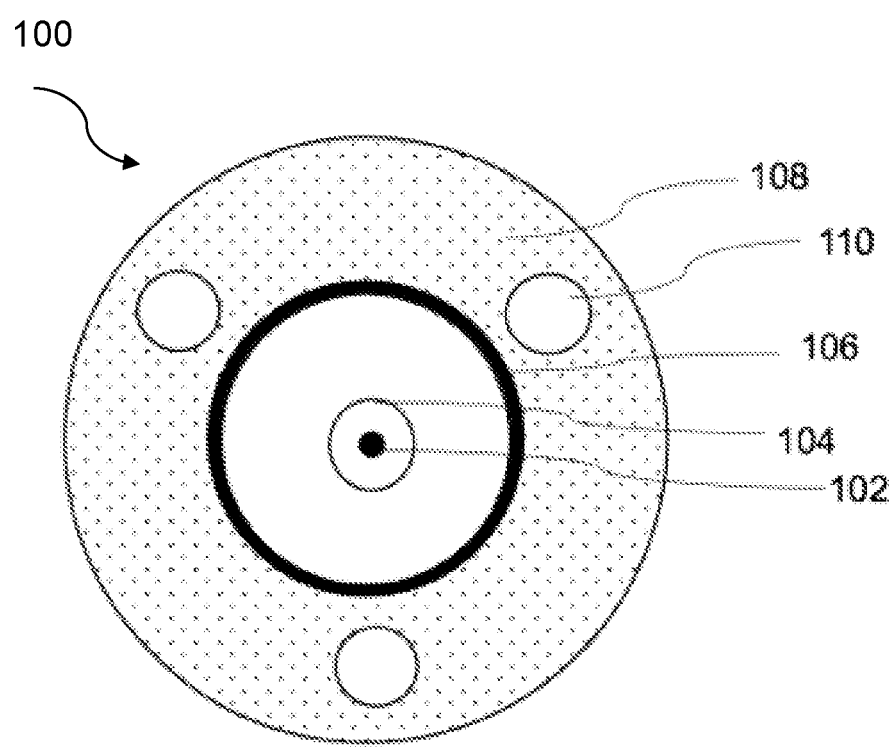
FIG. 1 is a pictorial representation of a dielectric predictable break load aerial drop cable in accordance with an embodiment of the present invention.
Figure 2:
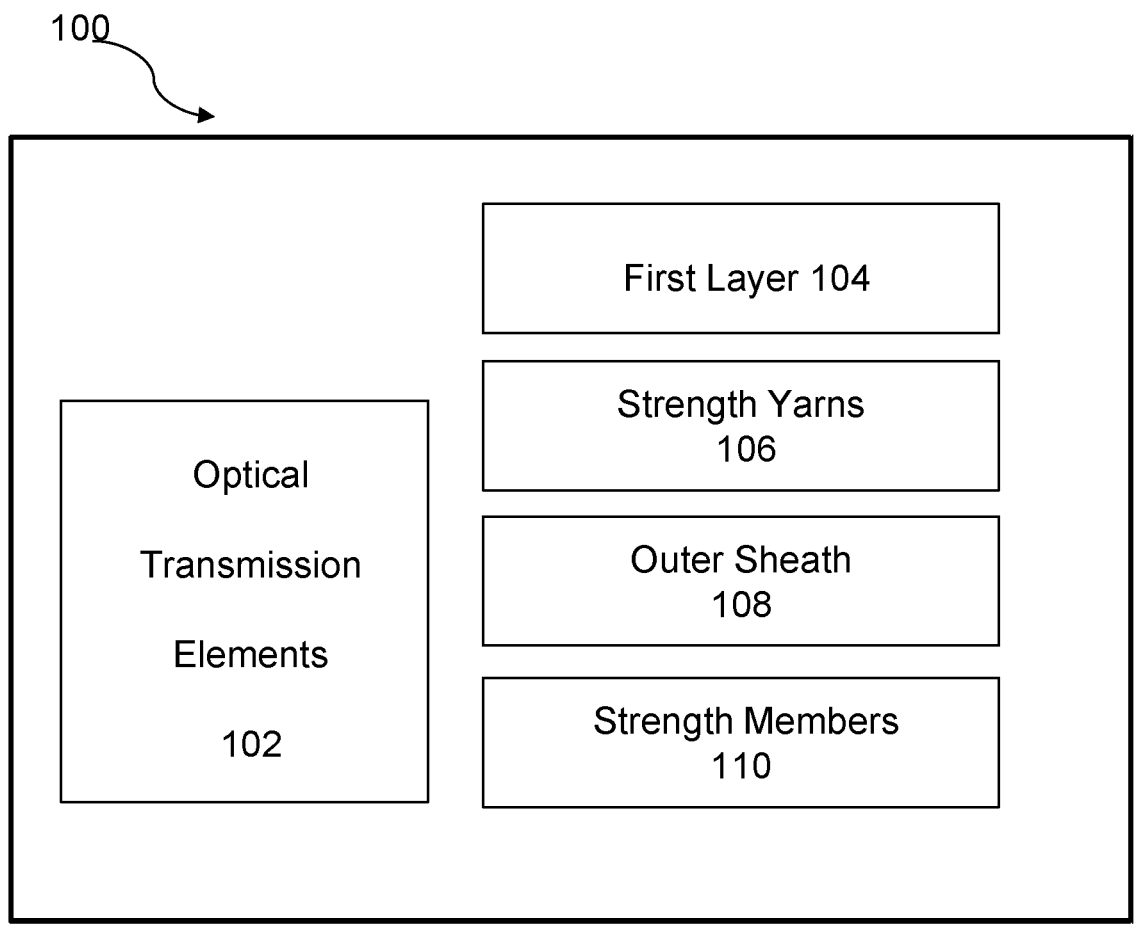
FIG. 2 is a block diagram illustrating various components of a dielectric predictable break load aerial drop cable in accordance with an embodiment of the present invention.

The principles of the present invention and their advantages are best understood by referring to FIG. 1 to FIG. 2. In the following detailed description numerous specific details are set forth in order to provide a thorough understanding of the embodiment of invention as illustrative or exemplary embodiments of the disclosure, specific embodiments in which the disclosure may be practiced are described in sufficient detail to enable those skilled in the art to practice the disclosed embodiments. However, it will be obvious to a person skilled in the art that the embodiments of the invention may be practiced with or without these specific details. In other instances, well known methods, procedures and components have not been described in details so as not to unnecessarily obscure aspects of the embodiments of the invention.

The following detailed description is, therefore, not to be taken in a limiting sense, and the scope of the present disclosure is defined by the appended claims and equivalents thereof. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present disclosure.

Although the terms first, second, etc. may be used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The following brief definition of terms shall apply throughout the present invention:

An optical fiber refers to a medium associated with transmission of information over long distances in the form of light pulses. The optical fiber uses light to transmit voice and data communications over long distances when encapsulated in a jacket/sheath. The optical fiber may be of ITU.T G.657A2 category.

The ITU.T, stands for International Telecommunication Union-Telecommunication Standardization Sector, is one of the three sectors of the ITU. The ITU is the United Nations specialized agency in the field of telecommunications and is responsible for studying technical, operating and tariff questions and issuing recommendations on them with a view to standardizing telecommunications on a worldwide basis.

Unlike conventional optical fiber cables, the present disclosure proposes an optical fiber cable, i.e., a dielectric predictable break load aerial drop cable that may break at a predefined break load and has a neutral bending performance. Particularly, the dielectric predictable break load aerial drop cable is a work safe optical fiber cable with a small diameter and is a lightweight aerial cable. Moreover, the dielectric predictable break load aerial drop cable is designed for aerial installation with a minimum tensile strength of sufficient span length up to 55 meters. Further, the dielectric predictable break load aerial drop cable is designed with a breaking load in a range of 1300N-2100N. The breaking load requirement is optimised for maximum installation and operational safety of aerial deployment. The breaking load of 1300N-2100N ensures predictable cable failure, which is below the breaking strength of support structures such as wooden poles. In an event of a high-sided vehicle strike, the cable breaks first without collapsing and breaking the support structures that ensures minimum collateral damage and risk of injury in the event of vehicle strike, therefore significantly improving installation, working and operational safety of the aerial deployment.

The aerial drop cable 100 corresponds to a cable that may strung overhead between two fixed points over a span length. And, the dielectric predictable break load aerial drop cable 100 does not include metal in the cable, hence, may be used near power cables. Particularly, the dielectric predictable break load aerial drop cable 100 breaks at a predefined load. Moreover, the predefined load may allow the dielectric predictable break load aerial drop cable 100 to break without bringing down the support structures (i.e., aerial support structures) such as poles etc. in case load is experienced by the dielectric predictable break load aerial drop cable 100. Further, the dielectric predictable break load aerial drop cable 100 may prevent damage to adjacent support structures. Such that, if one support structure goes down, then the dielectric predictable break load aerial drop cable 100 may break instead of pulling the support structure down.

Referring to FIG. 1 and FIG. 2, the dielectric predictable break load aerial drop cable 100 may comprise one or more optical transmission elements 102, a first layer 104, a plurality of strength yarns 106, an outer sheath 108 and a plurality of strength members 110.

In accordance with one embodiment of the present invention, the outer sheath has a plurality of strength members embedded in an equilateral position. In particular, the equilateral position has the plurality of strength members arranged in radially equidistant manner and circumferentially equidistant manner whereby enables breaking of the dielectric predictable break load aerial drop cable at a predefined break load and having a neutral bending performance.

In accordance with one embodiment of the present invention, the predefined break load is between 1300 to 2100 N.

In accordance with one embodiment of the present invention, each of the plurality of strength members has the plurality of strength yarns held together by epoxy.

In accordance with one embodiment of the present invention, the plurality of strength members is crushed to crimp the plurality of strength members with a connector.

In accordance with one embodiment of the present invention, the dielectric predictable break load aerial drop cable has a crush resistance of 1000 N/100 mm (+/−10%).

In accordance with one embodiment of the present invention, the dielectric predictable break load aerial drop cable has a sag less than 2% at a span length of 50-70 meters. Particularly, the sag is 1.8 m, when the dielectric predictable break load aerial drop cable is loaded with 35-50 kg load along a length at a span of 50-70 m, In accordance with one embodiment of the present invention, the dielectric predictable break load aerial drop cable has a strain less than 0.8 in one or more optical transmission elements, the dielectric predictable break load aerial drop cable is loaded with 35-50 kg load along the length at the span of 50-70 m.

In accordance with one aspect of the present invention, the dielectric predictable break load aerial drop cable breaks at a predefined break load and has a neutral bending performance.

In accordance with one embodiment of the present invention, one or more optical transmission elements 102 may be present in form of, but not limited to, a plurality of optical fibers, a group of loose optical fibers, a group of optical fiber ribbons or a stack of optical fiber ribbons, a group of bendable ribbons, a group of corrugated ribbons, a group of intermittently bonded optical fiber ribbons, a plurality of buffer tubes, a plurality of tight buffered optical fibers.

Alternatively, the optical fiber may be of ITU.T G.657A1 or G.657B3 or G.652D or other suitable category. The optical fiber may have a diameter of 250 microns and a bare optical fiber may have a diameter of 242+/−7 microns. The optical fiber may have a maximum attenuation less than 0.4 dB at 1310 nm (nano-meter), or 0.3 dB at 1550 nm.

In accordance with an embodiment, the optical fiber may be a bend insensitive fiber that has less degradation in optical properties during bending of the optical fiber cable. The optical fibers may be coloured fiber. The optical fiber may be a single mode optical fiber, a multicore optical fiber, a multimode optical fiber or the like. The single mode optical fiber carries only a single mode of light and the multimode optical fiber carries multiple modes of light to propagate. The multicore optical fibers comprise of multiple cores as opposed to the single mode optical fiber and the multimode optical fibers that comprise only a single core.

In accordance with one embodiment of the present invention, the number of one or more optical transmission elements 102 may be 4 to 48. Moreover, the optical transmission elements 102 may be encapsulated by a first layer 104 to form a core of the dielectric predictable break load aerial drop cable 100. Further, the first layer 104 may be a tight buffer.

In accordance with one embodiment of the present invention, the plurality of buffer tubes is an encasement tube used to encapsulate a number of optical fibers or an optical fiber ribbon stack. A buffer tube is used in an optical fiber cable to provide mechanical isolation and protection from physical damages. The plurality of buffer tubes includes a plurality of optical transmission elements. Further, an optical fiber ribbon bundle is a group of a plurality of optical fiber ribbons arranged together. The optical fiber ribbon includes a number of optical fibers arranged together using a matrix material. Multiple individual optical fiber ribbons are stacked or grouped into a bundle to form the optical fiber ribbon bundle. Furthermore, an intermittently bonded optical fiber ribbon from the group of intermittently bonded optical fiber ribbons is formed by intermittently bonding the plurality of optical fibers with a special material that imparts a bending and rolling capability along a width of the intermittently bonded optical fiber ribbon.

In accordance with one embodiment of the present invention, the first layer 104 may be a reduced diameter micromodule that enables fast and easy installation, with reduced risk of kinking and damage of one or more optical transmission elements 102.

In accordance with one embodiment of the present invention, the first layer 104 may be kink resistant. In particular, kinking implies a discontinuous bend in a cable due to which optical properties of one or more optical transmission elements 102 degrades.

In accordance with one embodiment of the present invention, one or more optical transmission elements 102 encapsulated in the first layer 104 forms a uni-tube design.

In accordance with one embodiment of the present invention, the first layer 104 consisting of one or more optical transmission elements 102 may be filled with gel such as, but not limited to, thixotropic compound.

In accordance with one embodiment of the present invention, the first layer 104 may be made of material such as low-smoke zero-halogen.

In accordance with alternate embodiment of the present invention, the first layer 104 may be made of materials such as PBT (polybutylene terephthalate), polypropylene (PP), polyamide, or other polymers, thermoplastic material or a combination of any of suitable material.

In accordance with an embodiment of the present invention, the first layer 104 may have a diameter of 0.9±0.1 mm, which is a reduced diameter. In particular, the diameter of the first layer 104 above 0.9±0.1 mm may make the dielectric predictable break load aerial drop cable 100 bulky. Moreover, the diameter of the first layer 104 below 0.9±0.1 mm may not be suitable for installation.

In accordance with one embodiment of the present invention, the first layer 104 is surrounded by the plurality of strength yarns 106.

In an exemplary example, the plurality of strength yarns 106 may be water swellable aramid yarns distributed over and around the first layer 104. In particular, an aramid yarn is a high-performance super fiber with high strength and fire-retardant properties.

In another example, the plurality of strength yarns 106 may be made from any other suitable material. The plurality of strength yarns 106 may impart strength to the dielectric predictable break load aerial drop cable 100. Further, the plurality of strength yarns 106 may provide cushioning to the dielectric predictable break load aerial drop cable 100. Furthermore, the plurality of strength yarns 106 or other water swelling elements may prevent water/moisture ingression inside the first layer 104 longitudinally.

In accordance with one embodiment of the present invention, the plurality of strength yarns 106 may be surrounded by the outer sheath 108. The outer sheath 108 may be referred to as a jacket or a sheath. The outer sheath 108 may be extruded over the plurality of strength members 110. In particular, sheathing (extrusion) is done at a high temperature (more than 100° C.). The sheathing is a process of squeezing a sheathing material through a funnel of a die as the core runs through the center.

In accordance with one embodiment of the present invention, the sheathing material for the outer sheath 108 may include, but not limited to, polyvinyl chloride, polyethylene (such as High Density Polyethylene (HDPE), Medium Density Polyethylene, and Low Density Polyethylene), polyurethane, thermoplastic rubber/elastomer, thermoplastic chlorinated polyethylene, thermoset polyolefins or combination thereof. Preferably, the outer sheath 108 may be formed using Ultra-violet (UV) stabilised black polyethylene.

In accordance with one embodiment of the present invention, the outer sheath 108 may have a nominal thickness of 1.5 mm (millimeter) as below the nominal thickness of 1.5 mm, the outer sheath 108 may become mechanically weak and beyond the nominal thickness of 1.5 mm, a bulky cable may be produced that may not be suitable for installation.

In accordance with one embodiment of the present invention, the outer sheath 108 may have the plurality of strength members 110 embedded in an equilateral position. The equilateral position may have the plurality of strength members 110 arranged in radially equidistant manner and circumferentially equidistant manner.

In an example, the number of strength members 110 may be 3. In such a case, an angle formed by placement of 3 strength members 110 may be 120 degrees.

In accordance with an alternate embodiment of the present invention, the number of the strength members 110 may vary. In such a case, the angle may also vary.

In accordance with one embodiment of the present invention, the plurality of strength members 110 may provide predictable break load and excellent crush protection/resistance performance. The crush resistance is an ability of a cable to withstand and/or recover from the effects of a compressive force.

In accordance with one embodiment of the present invention, each of the plurality of strength members 110 may be embedded at the same radius.

In accordance with an alternate embodiment of the present invention, each of the plurality of strength members 110 may be embedded at different radius.

In accordance with one embodiment of the present invention, each of the plurality of strength members 110 may have the same dimension.

In accordance with an alternate embodiment of the present invention, each of the plurality of strength members 110 may have different dimensions.

In accordance with an embodiment of the present invention, the plurality of strength members may be made of, but not limited to, FRP (Fiber Reinforced Plastic), ARP (Aramid Reinforced Plastic) or any other suitable dielectric/strength material.

In accordance with an embodiment of the present invention, the plurality of strength members 110 may have a round shape, a flat shape or any other suitable shape.

In accordance with an embodiment of the present invention, the plurality of strength members 110 may enable the dielectric predictable break load aerial drop cable 100 to be used nearby a high voltage cable as the plurality of strength members 110 is prone to lightning strikes and electromagnetic effects from a nearby high voltage line.

In accordance with an embodiment of the present invention, the dielectric predictable break load aerial drop cable 100 may be suitable for use under 11 kV (kiloVolt) power cables. The plurality of strength members 110 may be coated with EAA (Ethylene Acrylic Acid) or EVA (Ethylene-Vinyl Acetate) coating for better adhesion with the outer sheath 108.

In accordance with an embodiment of the present invention, each of the plurality of strength members may have the plurality of strength yarns 106 held together by an epoxy. The epoxy is a material that hardens (brittle) on cooling. Any other suitable material in place of epoxy may be used.

In accordance with an embodiment of the present invention, the plurality of strength members 110 may be crushed to crimp the plurality of strength members 110 with a connector while the dielectric predictable break load aerial drop cable 100 may have a crush resistance of 1000 N/100 mm (+/−10%), and crushing is performed to break the epoxy. That is, due to the proposed arrangement and properties, maintaining a crush resistance and crimping with the connector may simultaneously be possible as the plurality of strength members 110 provides crush resistance and crushing the plurality of strength members 110 allows the plurality of strength yarns 106 to be crimped i.e., connected/joined easily and appropriately with the connector. The crush resistance is an ability of a cable to withstand and/or recover from the effects of a compressive force.

In accordance with an embodiment of the present invention, the plurality of strength members 110 may protect the dielectric predictable break load aerial drop cable 100 from buckling. In particular, the buckling corresponds to a sudden change in shape i.e., deformation of a cable under a load.

The abovementioned arrangement of the dielectric predictable break load aerial drop cable may enable breaking of the dielectric predictable break load aerial drop cable 100 at a predefined break load and having a neutral bending performance. The neutral bending performance may correspond to no preferential bending, which may imply bending of the dielectric predictable break load aerial drop cable 100 with equal ease in all directions. The predefined break load may be between 1300 N (Newton) to 2100 N. That implies, the load to break off the cable shall be not less than 1300 N and not more than 2100 N.

In accordance with an embodiment of the present invention, the dielectric predictable break load aerial drop cable 100 may be characterized by sag. The sag may correspond to increment in downward hanging of the dielectric predictable break load aerial drop cable 100 over a period of time. The dielectric predictable break load aerial drop cable 100 may have the sag of less than 2% at the span length of 50-70 m (meters). Preferably, the dielectric predictable break load aerial drop cable 100 may have the sag of less than 1% at the span length of 55 m. The span length may correspond to a distance between the support structures such as wooden poles. Further, the dielectric predictable break load aerial drop cable 100 may have 1.8 m sag, when the dielectric predictable break load aerial drop cable 100 may be loaded with 35-50 kg load along a length at a span of 50-70 m i.e., along the span length of 50-70 m. Furthermore, the dielectric predictable break load aerial drop cable 100 may have strain less than 0.8 in one or more optical transmission elements 102 when the dielectric predictable break load aerial drop cable 100 may be loaded with 35-50 kg load along a span length of 50-70 m.

In accordance with an embodiment of the present invention, the dielectric predictable break load aerial drop cable (or cable) 100 may be characterized by a cable diameter, a cable length and a cable weight. The cable diameter may be 4.3+/−0.3 mm, the cable length may be 500 m+/−5% or 1000 m+/−5% and the cable weight 15+/−5% kg/km. Alternatively, the cable diameter, the cable length and the cable weight may vary.

In accordance with an embodiment of the present invention, the dielectric predictable break load aerial drop cable (or cable) 100 may be compliant with IEC 60794-1-2 standard, where the dielectric predictable break load aerial drop cable 100 may be characterized by an installation tension of about 150N, a maximum allowable tensile strength 500 N, a bend diameter of 12 D, an impact resistance of 5 nm and torsion of +/−360 degrees. The installation tension corresponds to tension experienced by the cable due to a pull during installation of the cable. Further, the tensile strength is referred to as an ability of the cable to resist a force that tends to pull it apart. Further, the bend diameter may be a minimum diameter one can bend the cable without damaging it, or shortening its life or kinking it. Further, the impact resistance is an ability of the cable to withstand an impact. Furthermore, the torsion may be an ability of the cable to withstand turns and twists as the cable usually encounters torsional forces.

The present invention for the dielectric predictable break load aerial drop cable advantageously may be suited for use in transport networks. The compact micro-module construction with fiber counts ranging from 4 to 48 fibers may offer a versatile and compact construction with benefits of quick fiber preparation ready for installation. The dielectric predictable break load aerial drop cable 100 may be manufactured in such a way that it has fast and easy midspan access. The dielectric predictable break load aerial drop cable 100 may be Ultra-violet (UV) protected and may comply to latest issue of various standards such as IEC.60794 series (International Electrotechnical Commission), EN 60794, ANSI/ICEA (American National Standards Institute/Insulated Cable Engineers Association) S-87-640, RoHS (Reduction of Hazardous Substances) compliant, Telcordia GR-20, ITU-T Recommendations and British telecom.

Advantageously, the dielectric predictable break load aerial drop cable 100 may be suitable to be used as a 55 m short span aerial cable to deliver fibre to remote locations or drop to customer or business premises in FTTx (Fiber-to-the-x) applications. The dielectric predictable break load aerial drop cable 100 may reduce the complexity of network maintenance and upgrade and may improve end user experience. The dielectric predictable break load aerial drop cable 100 may be suitable for FTTH (Fiber-to-the-home) roll out and a range of light weight drop type design/construction cables for installation in fibre network in overhead and underground environments.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the disclosure have been described above and illustrated in some cases, it should be interpreted and understood as to have been presented only by way of illustration and example, but not by limitation. Thus, the breadth and scope of a preferred embodiment should not be limited by any of the above-described exemplary embodiments.

It will be apparent to those skilled in the art that other embodiments of the invention will be apparent to those skilled in the art from consideration of the specification and practice of the invention. While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope of the invention. It is intended that the specification and examples be considered as exemplary, with the true scope of the invention being indicated by the claims.

It is to be understood that the terms so used are interchangeable under appropriate circumstances and embodiments of the invention are capable of operating according to the present invention in other sequences, or in orientations different from the one(s) described or illustrated above.

What is claimed is:

1. A dielectric predictable break load aerial drop cable comprising:
   one or more optical transmission elements;
   a first layer surrounding the one or more optical transmission element;
   a plurality of strength yarns surrounding the first layer;
   an outer sheath surrounding the plurality of strength yarns, and the outer sheath has a plurality of strength members embedded in an equilateral position, whereby enabling breaking of the dielectric predictable break load aerial drop cable at a predefined break load with a neutral bending performance,
   wherein the dielectric predictable break load aerial drop cable has a sag less than 2% at a span length of 50-70 meters.

2. The dielectric predictable break load aerial drop cable as claimed in claim 1, wherein the plurality of strength members are arranged in radially equidistant manner.

3. The dielectric predictable break load aerial drop cable as claimed in claim 1, wherein the plurality of strength members are arranged in circumferentially equidistant manner.

4. The dielectric predictable break load aerial drop cable as claimed in claim 1, wherein the plurality of strength members and the plurality of strength yarns are held by an epoxy.

5. The dielectric predictable break load aerial drop cable as claimed in claim 1, wherein the plurality of strength members are crushed to crimp the plurality of strength members with a connector.

6. The dielectric predictable break load aerial drop cable as claimed in claim 1, wherein the dielectric predictable break load aerial drop cable has a crush resistance of 1000 N/100 mm.

7. The dielectric predictable break load aerial drop cable as claimed in claim 1, wherein the dielectric predictable break load aerial drop cable breaks at a predefined break load between 1300 and 2100 N.

8. The dielectric predictable break load aerial drop cable as claimed in claim 1, wherein the dielectric predictable break load aerial drop cable has a sag of 1.8 m, when the dielectric predictable break load aerial drop cable is loaded with 35-50 kg load along a length at a span of 50-70 m.

9. The dielectric predictable break load aerial drop cable as claimed in claim 1, wherein the dielectric predictable break load aerial drop cable has a strain less than 0.8 in the one or more optical transmission elements.

10. The dielectric predictable break load aerial drop cable as claimed in claim 1, wherein the plurality of strength members are coated with EAA (Ethylene Acrylic Acid) and/or EVA (Ethylene-Vinyl Acetate).

11. A dielectric predictable break load aerial drop cable comprising:
one or more optical transmission elements;
a first layer surrounding the one or more optical transmission elements;
a plurality of strength yarns surrounding the first layer;
an outer sheath surrounding the plurality of strength yarns, wherein a plurality of strength members is embedded in the outer sheath, wherein each of the plurality of strength members has the plurality of strength yarns held together by epoxy, and
wherein the plurality of strength members is crushed to crimp the plurality of strength members with a connector, while the dielectric predictable break load aerial drop cable has a crush resistance of 1000 N/100 mm (+/−10%),
wherein the dielectric predictable break load aerial drop cable has a sag less than 2% at a span length of 50-70 meters.

12. The dielectric predictable break load aerial drop cable as claimed in claim 11, wherein the plurality of strength members is embedded in the outer sheath in an equilateral position.

13. The dielectric predictable break load aerial drop cable as claimed in claim 12, wherein the plurality of strength members arranged in a radially equidistant manner.

14. The dielectric predictable break load aerial drop cable as claimed in claim 12, wherein the plurality of strength members arranged in a circumferentially equidistant manner enabling a neutral bending performance.

15. The dielectric predictable break load aerial drop cable as claimed in claim 11, wherein the dielectric predictable break load aerial drop cable breaks at a predefined break load between 1300 and 2100 N.

16. The dielectric predictable break load aerial drop cable as claimed in claim 11, wherein the sag is 1.8 m when the dielectric predictable break load aerial drop cable is loaded with 35-50 kg load along a length at a span of 50-70 m.

17. The dielectric predictable break load aerial drop cable as claimed in claim 11, wherein the dielectric predictable break load aerial drop cable has a strain less than 0.8 in the one or more optical transmission elements, when the dielectric predictable break load aerial drop cable is loaded with 35-50 kg load along the length at a span of 50-70 m.

18. The dielectric predictable break load aerial drop cable as claimed in claim 11, wherein the plurality of strength members are coated with EAA (Ethylene Acrylic Acid) and/or EVA (Ethylene-Vinyl Acetate).

* * * * *